(12) United States Patent
Le Leannec et al.

(10) Patent No.: US 9,681,140 B2
(45) Date of Patent: Jun. 13, 2017

(54) DEVICE AND A METHOD FOR ENCODING AN IMAGE AND CORRESPONDING DECODING METHOD AND DECODING DEVICE

(71) Applicant: THOMSON LICENSING, Issy les Mooulineaux (FR)

(72) Inventors: Fabrice Le Leannec, Mouaze (FR); Sebastien Lasserre, Thorigne Fouillard (FR); Yannick Olivier, Thorigne Fouillard (FR)

(73) Assignee: THOMSON LICENSING, Issy-les-Moulineaux (FR)

(*) Notice: Subject to any disclaimer, the term of this patent is extended or adjusted under 35 U.S.C. 154(b) by 0 days.

(21) Appl. No.: 14/970,763

(22) Filed: Dec. 16, 2015

(65) Prior Publication Data

US 2016/0173884 A1   Jun. 16, 2016

(30) Foreign Application Priority Data

Dec. 16, 2014   (EP) .................................... 14307055
Dec. 16, 2014   (EP) .................................... 14307057

(51) Int. Cl.
*G06K 9/00* (2006.01)
*H04N 19/186* (2014.01)
(Continued)

(52) U.S. Cl.
CPC ......... *H04N 19/186* (2014.11); *H04N 19/103* (2014.11); *H04N 19/124* (2014.11);
(Continued)

(58) Field of Classification Search
CPC .. H04N 19/186; H04N 19/126; H04N 19/147; H04N 19/103; H04N 19/124; H04N 19/63; H04N 19/18
(Continued)

(56) References Cited

U.S. PATENT DOCUMENTS

2008/0175496 A1* 7/2008 Segall .................... G06T 5/009
382/238

FOREIGN PATENT DOCUMENTS

CN    102186069    9/2011
JP    2011004345   1/2011
(Continued)

OTHER PUBLICATIONS

Okuda et Al "Effective color space representation for wavelet based compression of HDR images" 2007 14th International Conference on Image Analysis and Processing Conference Paper English.
(Continued)

*Primary Examiner* — Andrew Moyer
(74) *Attorney, Agent, or Firm* — Tutunjian & Bitetto, P.C.

(57) ABSTRACT

A method for encoding an image represented in a perceptual color space is described. The image has at least a luminance component. The method includes transforming by a wavelet transform the luminance component to form at least one low frequency subband of wavelet coefficients, reconstructing a low frequency component for at least one spatial area of the low frequency subband, subtracting the reconstructed low frequency component from the wavelet coefficients of the spatial area, quantizing the wavelet coefficients of the spatial area responsive to the threshold, the threshold being proportional to the reconstructed low frequency component of the spatial area and encoding the quantized wavelet coefficients and the low frequency component.

24 Claims, 8 Drawing Sheets

(51) Int. Cl.
H04N 19/124 (2014.01)
H04N 19/63 (2014.01)
H04N 19/18 (2014.01)
H04N 19/147 (2014.01)
H04N 19/103 (2014.01)
H04N 19/126 (2014.01)

(52) U.S. Cl.
CPC ......... *H04N 19/126* (2014.11); *H04N 19/147* (2014.11); *H04N 19/18* (2014.11); *H04N 19/63* (2014.11)

(58) Field of Classification Search
USPC .......................................... 382/166, 232–253
See application file for complete search history.

(56) References Cited

FOREIGN PATENT DOCUMENTS

WO  WO2015091309  6/2015
WO  WO2015128269  9/2015

OTHER PUBLICATIONS

Xu et Al "High-dynamic-range still-image encoding in JPEG 2000" :IEEE Computer Graphics and Applications, 2005 vol. 25, No. 6 Journal Paper English.

Iwahashi et Al "Efficient lossless bit depth scalable coding for HDR images" 2012 Asia-Pacific Signal and Information Processing Association Dec. 3-6, 2012 Annual Summit and Conference Conference Paper English.

Shin et Al "A Wavelet-Based Encoding Algorithm for High Dynamic Range Images" The open signal processing Journal 2010, pp. 13-19.

Zhang et Al <<Perceptually Lossless High Dynamic Range Image Compression with JPEG 2000>>ICIP 2012, Orlando, Florida.

Larson et Al <<The LogLuv encoding for full-gamut high-dynamic range images D, Journal of Graphics Tools, vol. 3, pp. 15-32, Mar. 1998.

Wang et Al "High-dynamic range image compression based on JPEG2000" Computer Engineering and Applications vol. 43, No. 26 81-3 Journal Paper Chinese.

Zhang et Al "Image and video compression for HDR content" Proceedings of the SPIE—The International Society for Optical Engineering, Mar. 31, 2015, vol. 8499 Conference Paper Journal Paper English.

Mantiuk et al: "Backward compatible high dynamic range MPEG video compression", ACM transactions on graphics (TOG), ACM, US, Jul. 30, 2006, pp. 713-723, XP007902456, ISSN: 0730-0301, DOI: 10.1145/1141911.1141946, *figures 2-7*, *paragraph 100031*, *paragraph [03.1] —paragraph [03.3]*.

Touze et al: "HDR video coding based on local LDR quantization", HDRi2014—Second international conference and SME workshop on HDR imaging, Mar. 4, 2014, XP055112158, *paragraph [0003]*, *figures 1,2*.

Lasserre et al: "High dynamic range video coding", 16. JCT-VC meeting; Sep. 1, 2014—Jan. 17, 2014; San José; (Joint collaborative team on video coding of ITU-TSG. 16 and ISO/IEC JTC1/SC29/WG11), Jan. 15, 2014, XP030115678, *figures 1.2*, paragraph [02.1].

Le Leannec etal: "Usage of modulation channel for high bit-depth and floating point signal encoding", 18. JCT-VC meeting; Jun. 30, 2015-Sep. 7, 2014; Sapporo; (Joint collaborative team on video coding of ITU-T SG16 and ISO/IEC JTC1/SC29/WG11), Jun. 26, 2014, XP030116574, *paragraph [annex 5].

ITU_T Recommendations T800 Aug. 2002, Information technology—JPEG 2000 image coding system: Core coding system, International Standard ISO/IEC 15444-1, ITU-T Rec. T.800 (Aug. 2002).

Oh et al: "Visually lossless JPEG2000 using adaptive visibility thresholds and visual masking effects", in Proceedings of the 43th asilomar conference on signals, systemss and computer, 2009.

\* cited by examiner

Image Y transformed by a DWT

Spatial areas in the low
frequency subband LL

DEVICE AND A METHOD FOR ENCODING AN IMAGE AND CORRESPONDING DECODING METHOD AND DECODING DEVICE

This application claims the benefit, under 35 U.S.C. §119 of European Patent Application No. 14307055.5, filed Dec. 16, 2014 and European Patent Application No. 14307057.1, filed Dec. 16, 2014.

1. TECHNICAL FIELD

In the following, a method and a device for encoding an image represented in a perceptual color space are disclosed. Corresponding decoding method and decoding device are further disclosed.

2. BACKGROUND ART

Low-Dynamic-Range images (LDR images) are images whose luminance values are represented with a limited number of bits (most often 8 or 10). Such a representation does not render correctly small signal variations, in particular in dark and bright luminance ranges. In high-dynamic range images (HDR images), the signal representation is extended in order to maintain a high accuracy of the signal over its entire range. In HDR images, pixel values are usually represented in floating-point format (either 32-bit or 16-bit for each component, namely float or half-float).

The most popular high-dynamic-range file format is openEXR half-float format (16-bit per RGB component, i.e. 48 bits per pixel) or openEXR integer format with a long representation, typically at least 16 bits.

It is known for encoding a HDR image to reduce the dynamic range of the image in order to encode the image with a legacy encoder (initially configured to encode LDR images). In the document from Larson entitled "*LogLuv encoding for full gamut, high dynamic range images*" published in 1998 in Journal of Graphics Tools, the HDR images are represented in a LogLuv color space. The luminance and chrominance components are then processed by a JPEG2000 encoder in the same way as classical LDR images. Wavelet based encoders such as JPEG2000 encoders are widely used in the digital cinema industry. The LogLuv is a color space used for representing HDR images but is not well suited for compression.

3. BRIEF SUMMARY

A method for encoding an image represented in a perceptual color space, wherein the image has at least a luminance component is disclosed. The method comprises:
 transforming by a wavelet transform the luminance component to form at least one low frequency subband of wavelet coefficients;
 reconstructing a low frequency component for at least one spatial area of the low frequency subband;
 subtracting the reconstructed low frequency component from the wavelet coefficients of the spatial area;
 quantizing the wavelet coefficients in the spatial area responsive to the threshold, the threshold being proportional to the reconstructed low frequency component of the spatial area; and
 encoding the quantized wavelet coefficients and the low frequency component.

In another embodiment, a method for encoding an image represented in a perceptual color space, wherein the image has at least a luminance component is disclosed. The method comprises:
 transforming by a partial wavelet transform the luminance component to form at least one low frequency subband of wavelet coefficients and inverse transforming the at least one low frequency subband of wavelet coefficients to form a low frequency image;
 reconstructing a low frequency component for at least one spatial area of the low frequency image;
 subtracting the reconstructed low frequency component from the luminance component;
 transforming by a wavelet transform the luminance component to form at least one low frequency subband of wavelet coefficients, the threshold being proportional to the reconstructed low frequency component of the spatial area;
 quantizing the wavelet coefficients of the spatial area responsive to the threshold; and
 encoding the quantized coefficients and the low frequency components.

These encoding methods make it possible to encode an HDR content with a wavelet based approach.

A coding device for encoding an image represented in a perceptual color space, the image having at least a luminance component is disclosed. The coding device comprises at least a processor configured to:
 transform by a wavelet transform the luminance component to form at least one low frequency subband of wavelet coefficients;
 reconstruct a low frequency component for at least one spatial area of the low frequency subband;
 subtract the reconstructed low frequency component from the wavelet coefficients of the spatial area;
 quantize the wavelet coefficients in the spatial area responsive to a threshold, the threshold being proportional to the reconstructed low frequency component of the spatial area; and
 encode the quantized wavelet coefficients and the low frequency component.

A coding device for encoding an image represented in a perceptual color space, the image having at least a luminance component is disclosed. The coding device comprises:
 means for transforming by a wavelet transform the luminance component to form at least one low frequency subband of wavelet coefficients;
 means for reconstructing a low frequency component for at least one spatial area of the low frequency subband;
 means for subtracting the reconstructed low frequency component from the wavelet coefficients of the spatial area;
 means for quantizing the wavelet coefficients in the spatial area responsive to the threshold, the threshold being proportional to the reconstructed low frequency component of the spatial area; and
 means for encoding the quantized wavelet coefficients and the low frequency component.

A coding device for encoding an image represented in a perceptual color space is disclosed, the image having at least a luminance component. The coding device comprises at least a processor configured to:
 transform by a partial wavelet transform the luminance component to form at least one low frequency subband of wavelet coefficients and inverse transforming the at least one low frequency subband of wavelet coefficients to form a low frequency image;

reconstruct a low frequency component for at least one spatial area of the low frequency image;

subtract the reconstructed low frequency component from the luminance component;

transform by a wavelet transform the luminance component to form at least one low frequency subband of wavelet coefficients, the threshold being proportional to the reconstructed low frequency component of the spatial area;

quantize the wavelet coefficients of the spatial area responsive to the threshold; and encode the quantized coefficients and the low frequency components.

A coding device for encoding an image represented in a perceptual color space, the image having at least a luminance component is disclosed. The coding device comprises:

means for transforming by a partial wavelet transform the luminance component to form at least one low frequency subband of wavelet coefficients and inverse transforming the at least one low frequency subband of wavelet coefficients to form a low frequency image;

means for reconstructing a low frequency component for at least one spatial area of the low frequency image;

means for subtracting the reconstructed low frequency component from the luminance component;

means for transforming by a wavelet transform the luminance component to form at least one low frequency subband of wavelet coefficients, the threshold being proportional to the reconstructed low frequency component of the spatial area;

means for quantizing the wavelet coefficients of the spatial area responsive to the threshold; and means for encoding the quantized coefficients and the low frequency components.

The following embodiments and variants apply to all the method for encoding and coding devices disclosed above.

Exemplarily, the spatial area comprises a single wavelet coefficient and reconstructing a low frequency component for the spatial area of the low frequency subband comprises quantizing and inverse quantizing the single wavelet coefficient.

In a variant, the spatial area comprises at least two wavelet coefficients and reconstructing a low frequency component for the spatial area of the low frequency subband comprises averaging the at least two wavelet coefficients into an averaged coefficient, quantizing and inverse quantizing the average coefficient.

In a first embodiment, quantizing the wavelet coefficients of the spatial area comprises:

normalizing the wavelet coefficients using the threshold of the spatial area; and quantizing the normalized wavelet coefficients.

In a second embodiment, quantizing the wavelet coefficients in the spatial area comprises:

determining a quantization step size for the spatial area from the threshold of the spatial area; and quantizing the wavelet coefficients using the determined quantization step size.

In a specific embodiment, the image has at least one chrominance component and the method further comprises:

transforming by the wavelet transform the at least one chrominance component into chrominance wavelet coefficients;

normalizing the chrominance wavelet coefficients by the threshold of the spatial area to which the chrominance wavelet coefficients belong.

Advantageously, the perceptual color space is a CIELAB color space.

In a specific embodiment, the at least one low frequency subband of wavelet coefficients is divided into spatial areas and the encoding method applies on each spatial area.

A method for decoding an image having at least a luminance component represented in a perceptual color space is disclosed. The method comprises:

decoding wavelet coefficients of at least a low frequency subband and a low frequency component for at least one spatial area of the low frequency subband;

inverse quantizing the decoded wavelet coefficients of the spatial area responsive to the threshold, the threshold being proportional to the decoded low frequency component of the spatial area;

adding the decoded low frequency component to the wavelet coefficients of the spatial area; and transforming by an inverse wavelet transform the wavelet coefficients to form a reconstructed luminance component.

A method for decoding an image having at least a luminance component represented in a perceptual color space is disclosed. The method comprises:

decoding wavelet coefficients of at least a low frequency subband and a low frequency component for at least one spatial area of the low frequency subband;

inverse quantizing the decoded wavelet coefficients of the spatial area responsive to a threshold, the threshold being proportional to the decoded low frequency component of the spatial area;

transforming by an inverse wavelet transform the wavelet coefficients to form a reconstructed luminance component.

adding the decoded low frequency component to the luminance component.

A decoding device for decoding an image having at least a luminance component represented in a perceptual color space is disclosed. The decoding device comprises at least a processor configured to:

decode wavelet coefficients of at least a low frequency subband and a low frequency component for at least one spatial area of the low frequency subband;

inverse quantize the decoded wavelet coefficients of the spatial area responsive to a threshold, the threshold being proportional to the decoded low frequency component of the spatial area;

add the decoded low frequency component to the wavelet coefficients of the spatial area; and transform by an inverse wavelet transform the wavelet coefficients to form a reconstructed luminance component.

A decoding device for decoding an image having at least a luminance component represented in a perceptual color space s disclosed. The decoding device comprises:

means for decoding wavelet coefficients of at least a low frequency subband and a low frequency component for at least one spatial area of the low frequency subband;

means for inverse quantizing the decoded wavelet coefficients of the spatial area responsive to a threshold, the threshold being proportional to the decoded low frequency component of the spatial area;

means for adding the decoded low frequency component to the wavelet coefficients of the spatial area; and means for transforming by an inverse wavelet transform the wavelet coefficients to form a reconstructed luminance component.

A decoding device for decoding an image having at least a luminance component represented in a perceptual color space is disclosed. The decoding device comprises at least a processor configured to:

decode wavelet coefficients of at least a low frequency subband and a low frequency component for at least one spatial area of the low frequency subband;

inverse quantize the decoded wavelet coefficients of the spatial area responsive to a threshold, the threshold being proportional to the decoded low frequency component of the spatial area;

transform by an inverse wavelet transform the wavelet coefficients to form a reconstructed luminance component.

add the decoded low frequency component to the luminance component.

A decoding device for decoding an image having at least a luminance component represented in a perceptual color space is disclosed. The decoding device comprises:

means for decoding wavelet coefficients of at least a low frequency subband and a low frequency component for at least one spatial area of the low frequency subband;

means for inverse quantizing the decoded wavelet coefficients of the spatial area responsive to a threshold, the threshold being proportional to the decoded low frequency component of the spatial area;

means for transforming by an inverse wavelet transform the wavelet coefficients to form a reconstructed luminance component.

means for adding the decoded low frequency component to the luminance component.

The following embodiments and variants apply to all the method for decoding and decoding devices disclosed above.

In a first embodiment, inverse quantizing the wavelet coefficients of the spatial area comprises:

inverse quantizing the wavelet coefficients; and de-normalizing the wavelet coefficients using the threshold for the spatial area.

In a second embodiment, inverse quantizing the wavelet coefficients of the spatial area comprises:

determining a quantization step size for the spatial area from the threshold of the spatial area; and inverse quantizing the wavelet coefficients using the determined quantization step size.

In a specific embodiment, the image has at least one chrominance component and the method further comprises:

decoding chrominance wavelet coefficients; and de-normalizing the chrominance wavelet coefficients by the threshold of the spatial area to which the chrominance wavelet coefficients belong.

In a specific embodiment, the at least one low frequency subband of wavelet coefficients is divided into spatial areas and the decoding method applies on each spatial area.

Advantageously, the perceptual color space is a CIELAB color space.

A computer program product comprising program code instructions to execute the steps of the encoding method according to any of the embodiments and variants disclosed when this program is executed on a computer.

A computer program product comprising program code instructions to execute the steps of the decoding method according to any of the embodiments and variants disclosed when this program is executed on a computer.

A processor readable medium having stored therein instructions for causing a processor to perform at least the steps of the encoding method according to any of the embodiments and variants disclosed.

A processor readable medium having stored therein instructions for causing a processor to perform at least the steps of the decoding method according to any of the embodiments and variants disclosed.

4. BRIEF SUMMARY OF THE DRAWINGS

5. DETAILED DESCRIPTION

Figure 1:
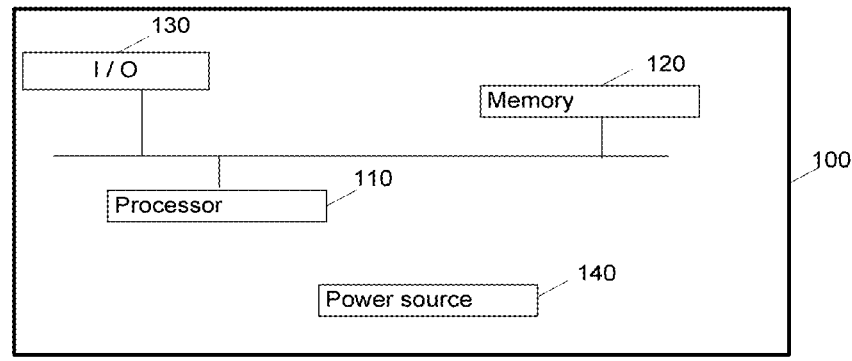
FIG. 1 represents an exemplary architecture of an encoding device configured to encode an image in a bitstream according to a specific and non-limitative embodiment.

Perceptual color spaces are well-known in the color science field. CieLAB and CieLUV are examples of such perceptual color spaces. It will be appreciated, however, that the present principles are not restricted to these specific perceptual color spaces.

A metric $d((L, C1, C2), (L', C1', C2'))$ is usually associated with a perceptual color space. The metric $d((L, C1, C2), (L', C1', C2'))$ is defined such that there exists a threshold $\Delta E_0$ (also referred to as the JND, Just Noticeable Difference) below which a person is not able to perceive a visual difference between the two colors $(L, C1, C2)$ and $(L', C1', C2')$ of the perceptual color space, i.e. in the case where $d((L, C1, C2), (L', C1', C2')) < \Delta E_0$, one is not able to perceive a visual difference between $(L, C1, C2)$ and $(L', C1', C2')$. This perceptual threshold is independent of the two colors $(L, C1, C2)$ and $(L', C1', C2')$ of the perceptual color space.

When an image comprises components belonging to a non-perceptual space such as (R,G,B) for example, the image is transformed in order to obtain a luminance component L and possibly two color components C1 and C2 which belong to a perceptual color space. The transform is defined as a function of the lighting environment used to visualize the image.

For example, assuming the initial color space is the (R,G,B) color space, the image is first transformed into the well-known linear space (X, Y, Z). An inverse gamma correction may possibly be applied before the transformation into the (X, Y, Z) space, if necessary. In the case where the perceptual color space is the LabCIE1976, the resulting image is transformed as follows:

$$L=116f(Y/Y_n)-16$$

$$C1=500(f(X/X_n)-f(Y/Y_n))$$

$$C2=200(f(Y/Y_n)-f(Z/Z_n))$$

where f is a conversion function for example given by:

$$f(r)=r^{1/3} \text{ if } r>(6/29)^3$$

$$f(r)=\tfrac{1}{3}*(29/6)^2*r+\tfrac{4}{29} \text{ otherwise}$$

and where $(X_n, Y_n, Z_n)$ is a triplet representative of reference lighting conditions used to visualize the image.

The following metric may be defined on the perceptual space LabCIE1976:

$$d((L,C1,C2),(L',C1',C2'))^2=(\Delta L)^2+(\Delta C1)^2+(\Delta C2)^2$$

where $\Delta L$ is the difference between the luminance components of two colors (L, C1, C2) and (L', C1', C2') and $\Delta C1$ (respectively $\Delta C2$) are the differences between the chrominance components of these two colors. In this space, a human eye is not able to perceive a visual difference between two colors as soon as $d((L, C1, C2), (L', C1', C2'))^2<(\Delta E_0)^2$. The threshold $\Delta E_0$ is independent of the two colors (L, C1, C2) and (L', C1', C2') of the perceptual space.

The metric for the LabCIE94 perceptual space is defined as follows:

$$d((L,C1,C2),(L',C1',C2'))^2:=(\Delta L)^2+(\Delta C/(1+k_1*C))^2+(\Delta H/(1+k_2*C))^2$$

These quantities are given by the following equations:

$$C^2 = C1^2 + C2^2, \text{ atan}\left(\frac{b}{a}\right) \text{ and } H = C*h.$$

where C is the chroma, h is the hue and $k_1$ and $k_2$ are non-null constant values. $\Delta C=C-C'=\sqrt{C1^2+C2^2}-\sqrt{(C1')^2+(C2')^2}$ A modified LabCIE94 may be defined for which the metric is identical to the metric of the LabCIE1976 color space. However, the definitions of L, C1 and C2 are different. They are thus denoted $\tilde{L}$, $\widetilde{C_1}$ and $\widetilde{C_2}$:

$$\tilde{L} = \text{sign}(Lr) \cdot \frac{116}{\beta} \cdot \ln\left(1 + \frac{|(Lr)| \cdot \beta}{116}\right),$$

with $\beta \in [0,1]$ where Lr is the residual value of the luminance around a mean value, e.g 116: Lr=L−116

If present, the chrominance components C1 and C2 are also transformed into the local perceptual color space as follows:

$$c = (C_1^2 + C_2^2)^{1/2}$$

$$\tilde{c} = \frac{\ln(1+kc)}{k}, k \text{ is a constant (e.g. } k = 0.5)$$

$$\tilde{C}_1 = C \cdot \frac{\tilde{c}}{c}, \tilde{C}_2 = C_2 \cdot \frac{\tilde{c}}{c}$$

The present principles are not limited to the perceptual space LabCIE1976 but may be applied to other type of perceptual space such as the LabCIE1994, LabCIE2000, which are the same Lab space but with a different metric to measure the perceptual distance, or any other Euclidean perceptual space for instance. Other examples are LMS spaces and IPT spaces. A condition is that the metric shall be defined on these perceptual spaces in order that the metric is preferably proportional to the perception difference; as a consequence, a homogeneous maximal perceptual threshold $\Delta E_0$ exists below which a person is not able to perceive a visual difference between two colors of the perceptual space.

FIG. 1 represents an exemplary architecture of an encoding device 100 configured to encode in a bitstream an image Y represented in a perceptual color space and having at least one luminance component (L) according to a specific and non-limitative embodiment. The encoding device 100 comprises one or more processor(s) 110, which is(are), for example, a CPU, a GPU and/or a DSP (English acronym of Digital Signal Processor), along with internal memory 120 (e.g. RAM, ROM, EPROM). The encoding device 100 comprises one or several Input/Output interface(s) 130 adapted to display output information and/or allow a user to enter commands and/or data (e.g. a keyboard, a mouse, a touchpad, a webcam); and a power source 140 which may be external to the encoding device 100. The device 100 may also comprise network interface(s) (not shown). The image Y may be obtained from a source. According to different embodiments, the source can be, but not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limitative embodiment, the encoding device 100 further comprises a computer program stored in the memory 120. The computer program comprises instructions which, when executed by the encoding device 100, in particular by the processor 110, make the encoding device 100 carry out the method described with reference to FIG. 2A or to FIG. 2B. According to a variant, the computer program is stored externally to the encoding device 100 on a non-transitory digital data support, e.g. on an external storage medium such as a HDD, CD-ROM, DVD, a read-only and/or DVD drive and/or a DVD Read/Write drive, all known in the art. The encoding device 100 thus comprises an interface to read the computer program. Further, the encoding device 100 could access one or more Universal Serial Bus (USB)-type storage devices (e.g., "memory sticks.") through corresponding USB ports (not shown).

According to exemplary and non-limitative embodiments, the encoding device 100 can be, but is not limited to:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

Figure 2A:
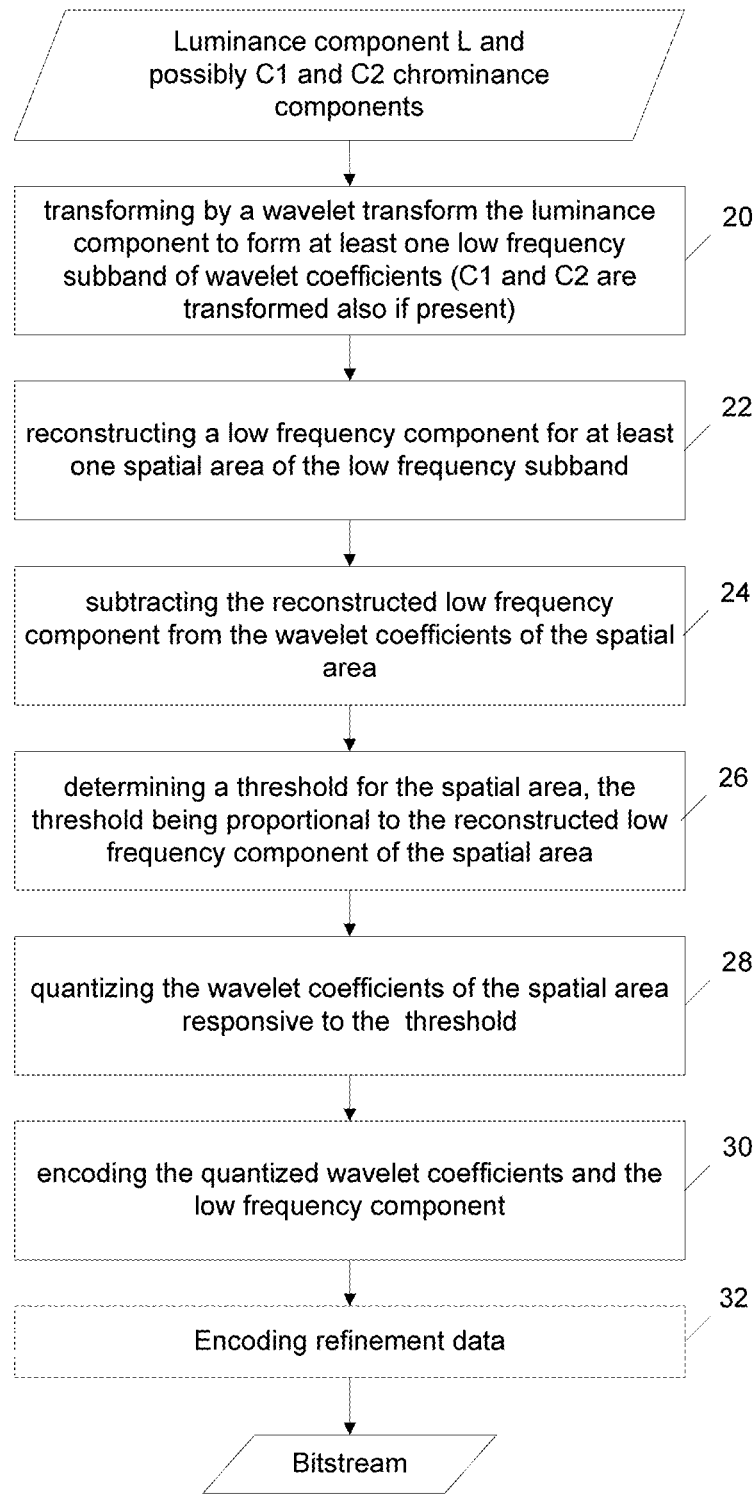
FIGS. 2A and 2B represent flowcharts of a method for encoding an image according to specific and non-limitative embodiments.

FIG. 2A represents a flowchart of a method for encoding an image Y represented in a perceptual color space and having at least one luminance component (L), according to a specific and non-limitative embodiment.

Figure 3A:
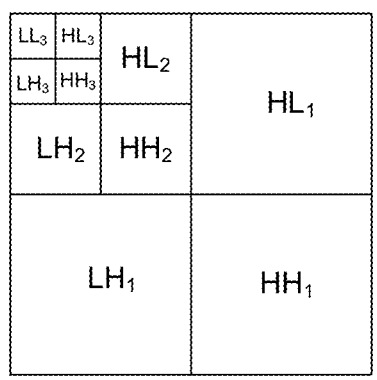
FIG. 3A shows an image transformed by a wavelet transform with 3 levels of decomposition.

In a step 20, the luminance component L of the image Y is transformed by a wavelet transform, e.g. by a Discrete Wavelet Transform (DWT), to form at least one low frequency subband of wavelet coefficients. FIG. 3A shows an image transformed by a wavelet transform with 3 levels of decomposition (d=1, 2 or 3). The transformed image is made of 10 subbands. On this figure, the low frequency subband is $LL_3$. If present, the chrominance components C1 and C2 are also transformed by a wavelet transform into wavelet coefficients.

Figure 8A:
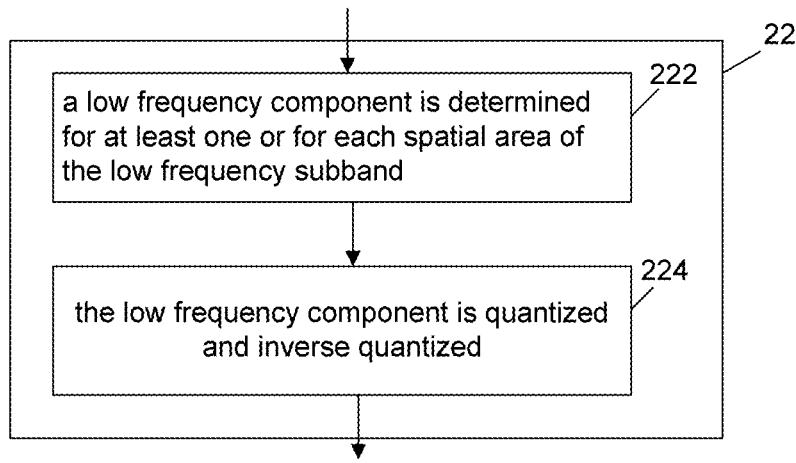
FIG. 8A represents a detail of the flowchart of the method for encoding an image depicted on FIG. 2A.

In a step 22, a low frequency component is reconstructed for at least one spatial area of the low frequency subband. A spatial area may be a block comprising at least one low frequency wavelet coefficient. In a variant, a low frequency component is reconstructed for each spatial area of the low frequency subband. The step 22 is detailed on FIG. 8A.

Figure 4A:
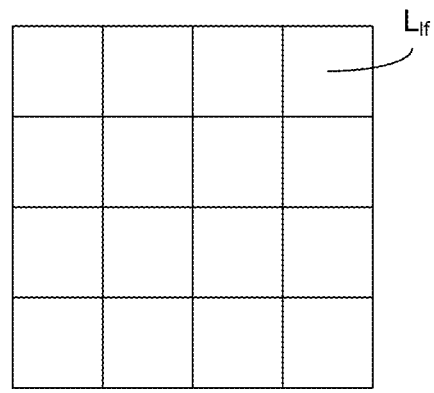
FIG. 4A shows a low frequency subband divided into 16 spatial areas.
Figure 5:
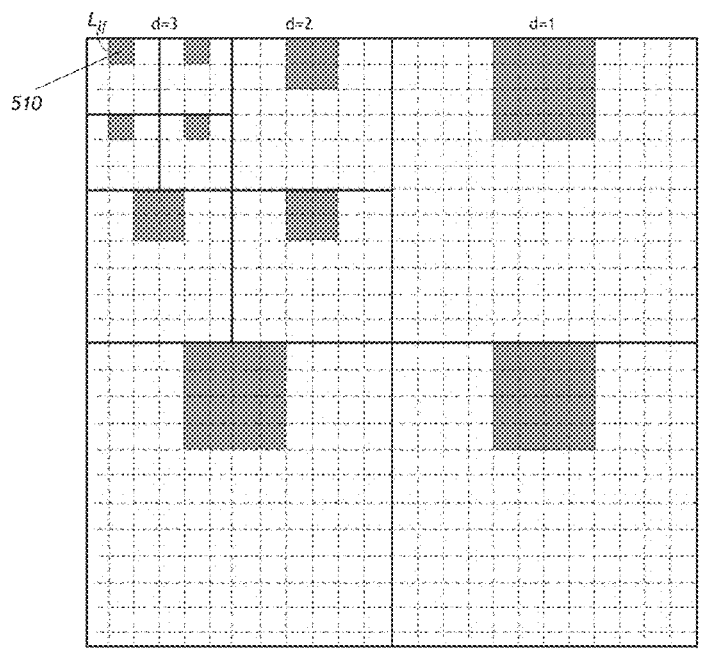
FIG. 5 shows an image organized into subbands and the subbands into code-blocks.

In a sub-step 222, a low frequency component is determined for the at least one spatial area of the low frequency subband or for each spatial area. FIG. 4A shows the low frequency subband divided into 16 spatial areas. In the case where one spatial area corresponds to a single wavelet coefficient, the low frequency component $L_{lf}$ for this spatial area is equal to this single wavelet coefficient. In the case where a spatial area comprises at least two wavelet coefficients, the at least two wavelet coefficients are averaged (arithmetic mean or geometric mean) into an average wavelet coefficient. In the latter case, the low frequency component $L_{lf}$ for this spatial area is equal to the average wavelet coefficient. JPEG2000 defines code-blocks (*JPEG2000 image coding system, Core coding system>>, ITU-T Recommendation T.800, 08/2002*). In a specific and non-limiting embodiment, one spatial area in the low frequency subband corresponds exactly to one code-block as defined in JPEG2000. FIG. 5 shows the image organized into subbands and the subbands into code-blocks. On this figure, the code-blocks are delimited by dotted lines.

In a sub-step 224, the low frequency component $L_{lf}$ is quantized and inverse quantized. The low frequency component $\hat{L}_{lf}$ obtained after quantization and inverse quantization is the reconstructed low frequency component: $\hat{L}_{lf}$=IQ (Q($L_{lf}$)) where Q( ) and IQ( ) are the quantizing and inverse quantizing functions respectively. The quantized low frequency component $L_{lf}$ may be advantageously used in a further step 30 of the encoding method.

In a step 24, for at least one or for each spatial area of the low frequency subband, the reconstructed low frequency component $\hat{L}_{lf}$ is subtracted from the corresponding wavelet coefficients $c_{LL}(u, v)$ of the low frequency subband (only for the luminance component). Specifically, $\hat{L}_{lf}$ is subtracted from the wavelet coefficients that belong to the spatial area for which $\hat{L}_{lf}$ is determined. For each wavelet coefficient $c_{LL}(u, v)$ in the low frequency subband of the luminance component: $c_{LL}^{I}(u, v) = c_{LL}(u, v) - \hat{L}_{lf}$ where (u,v) are the coordinates of the wavelet coefficient and the index I identifies the spatial area to which the wavelet coefficient $c_{LL}(u, v)$ belongs and $\hat{L}_{lf}$ is the reconstructed low frequency component determined for the spatial area to which $c_{LL}(u, v)$ belongs.

In a step 26, a threshold $\Delta E^I$ is determined for the at least one spatial area. In a variant, a threshold $\Delta E^I$ is determined for each spatial area. The threshold is proportional to the reconstructed low frequency component of this spatial area, i.e. $\Delta E^I \propto \hat{L}_{lf}$. Exemplarily, $$\Delta E^I = \Delta E_o \cdot \left(\frac{Y_l}{Y_n}\right)^{1/3} = \frac{\Delta E_o * \hat{L}_{lf}}{116}$$

where $\Delta E_o$ is dependent on the perceptual color space, and $Y_l$ is a linear-light luminance associated with the local environment of the considered spatial area. Therefore, the above equation represent the impact on the JND threshold obtained when changing the lighting environment from the nominal value $Y_n$ towards a local lighting environment represented by $Y_l$. In other words, when considering the Lab color transform equations, one gets the following relation:

$$\Delta E^I = \Delta E_o \cdot \frac{\hat{L}_{lf} + 16}{116}$$

If the linear part of the Lab color transform definition is ignored, one gets the follow relation:

$$\Delta E^I = \Delta E_o \cdot \frac{\hat{L}_{lf}}{116}$$

In a step 28, the wavelet coefficients of the at least one spatial area are quantized responsive to the threshold $\Delta E^I$ determined for this spatial area. In a variant, the wavelet coefficients in each subband, i.e. the low frequency subband and the other subbands if any, are quantized responsive to the threshold $\Delta E^I$ of the spatial area of index I to which the wavelet coefficients belong. FIG. 5 depicts a spatial area 510 in the subband LL (grey area) and its corresponding areas in the other subbands. All the wavelet coefficients in the grey areas are quantized using the same threshold $\Delta E^I$. In the following two different embodiments are disclosed.

In a first embodiment, the wavelet coefficients of the at least one spatial area are first normalized by the threshold $\Delta^I$ and then quantized by a quantization step $\Delta_b$. In a variant, the wavelet coefficients in each spatial area and in each subband b are first normalized by the threshold $\Delta E^I$ and then quantized by a quantization step $\Delta_b$. $\Delta_b$ is a quantization step whose size is independent of the spatial area but is defined for the subband b. $\Delta_b$ takes a value that is signaled in the bitstream and determined during the encoding process. It may be manually set or tuned to target a compressed picture size. Exemplarily, $\Delta b$ is identical for all subbands b.

$$c_b^l(u, v) = \begin{cases} c_b^l(u, v) \cdot \dfrac{1}{\Delta E^l} & \text{if } b = LL \\ c_b(u, v) \cdot \dfrac{1}{\Delta E^l} & \text{if } b \neq LL \end{cases}$$

According to a specific and non-limiting embodiment, the low frequency component(s) $L_{lf}$ is(are) encoded directly inside a normative JPEG2000 bitstream. In this case, the first $B_{lf}$ most significant bit planes are allocated for the encoding of these $L_{lf}$ values. Consequently, the normalization of the wavelet coefficients takes the following form:

$$c_b^l(u, v) = \begin{cases} c_b^l(u, v) \cdot \dfrac{1}{\Delta E^l} \cdot 2^{B_{lf}} & \text{if } b = LL \\ c_b(u, v) \cdot \dfrac{1}{\Delta E^l} \cdot 2^{B_{lf}} & \text{if } b \neq LL \end{cases}$$

In the case where the low frequency component(s) $L_{lf}$ is(are) encoded as metadata, the normalization is done without multiplying by $2^{B_{lf}}$. When present, the chrominance wavelet coefficients are normalized as follows $$c_b^l(u, v) = c_b(u, v) \cdot \dfrac{1}{\Delta E^l}$$

whatever the subband is, i.e. b=LL or b≠LL. The normalized wavelet coefficients may be thresholded by an upper bound value. This makes it possible to encode them by a JPEG2000 encoder on a limited number of bits.

In a second embodiment, a quantization step size $\Delta_b^l$ is defined locally for a spatial area of index I as follows:

$$\Delta_b^l = \Delta_b \times \Delta E^l$$

Then, the wavelet coefficients in at least one spatial area of index I of the low frequency subband LL are quantized by the locally defined quantization step size $\Delta_{LL}^l$. In a variant, the wavelet coefficients in each subband b and each spatial area of index I are quantized by the locally defined quantization step size $\Delta_b^l$. This second embodiment is applicable in cases where a quantization step is dedicated to some JPEG2000 coding entities that are representative of a spatial area in the image. In practice, this typically corresponds to precincts. In JPEG2000, a precinct contains all the coded data that represents the image at a given resolution level, at a given rectangular spatial location in the image. Hence precincts are a mean of representing an image area in a given resolution level in the compressed domain. It is possible to associate one quantization step to each precinct. Thus, in the present embodiment, a quantization step size $\Delta_b^l$ is associated with each precinct within each resolution level. Each precinct thus corresponds to a spatial area with which a value $\hat{L}_{lf}$ is associated.

Figure 6:
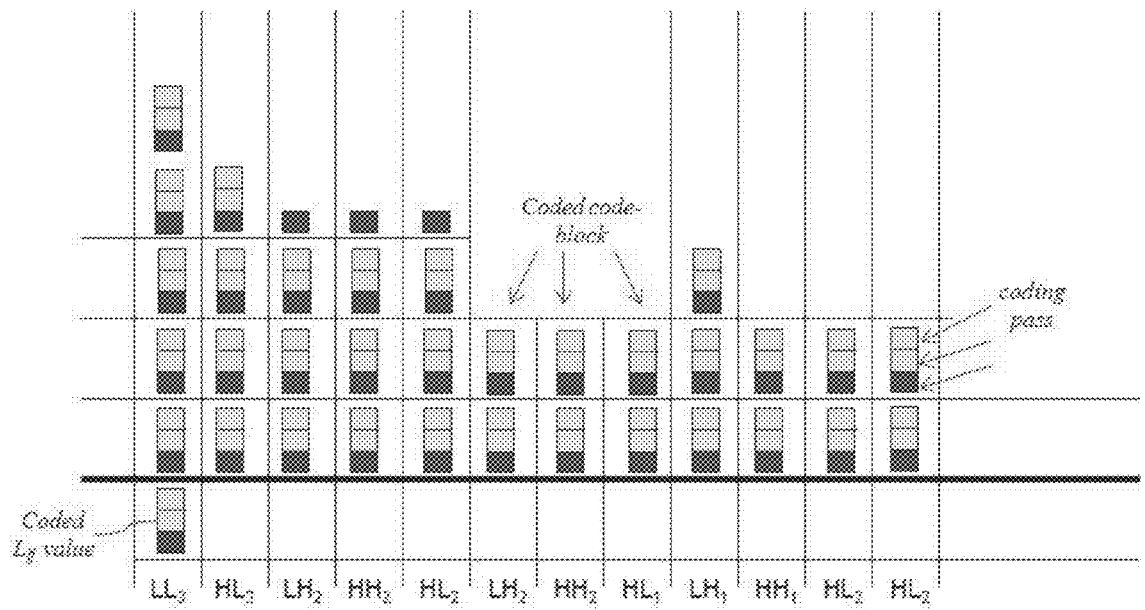
FIG. 6 illustrates the encoding of low frequency components according to an exemplary embodiment.

In a step 30, the quantized wavelet coefficients (luminance and possibly chrominance) and possibly the locally defined low frequency component(s) is(are) entropy coded in a bitstream. Indeed, encoding of the low frequency components $L_{lf}$ is possibly done during sub-step 224. Encoding the low frequency components $L_{lf}$ comprises quantizing $L_{lf}$ by Q( ). In an advantageous variant, the quantized low frequency components are obtained directly from the sub-step 224 of step 22. In a specific and non-limiting embodiment, the quantized low frequency components $L_{lf}$ are encoded as metadata and the quantized wavelet coefficients are encoded by a JPEG2000 compliant encoder, specifically an EBCOT algorithm. EBCOT algorithm is a two-tiered architecture. Tier-1 is a context-based adaptive arithmetic coder, which is composed of a context formation (CF) engine and a binary arithmetic coder (BAC). Tier-2 is responsible for rate-distortion optimization and bitstream formation. In a variant, a JPEG2000 compliant encoder is used to encode both the quantized wavelet coefficients and the quantized low frequency components $L_{lf}$. More precisely, the quantized low frequency components $L_{lf}$ are encoded jointly with the code-blocks of the LL subband. The quantized low frequency components $L_{lf}$ occupy $B_{lf}$ first bit planes. They are thus encoded as MSB (MSB stands for Most Significant Bit) of the coefficients of the subband as illustrated by FIG. 6. The bit planes of the other coefficients are shifted. Exemplarily, JPEG2000 provides such a shifting technique for regions of interest coding. On the decoder side, this makes sure that the reconstructed low frequency component $\hat{L}_{lf}$ are available for decoding the image. The coding pass indicated on FIG. 6 is a coding pass as defined by JPEG2000.

In an optional step 32, refinement data are encoded in the pixel domain in addition to the already coded image data. The goal of this additional encoding is to ensure that for each pixel of a given spatial area, the error introduced between the decoded pixel and its original value is lower than the Just Noticeable Difference threshold $\Delta E^l$ associated with the local spatial area. Therefore, this additional encoding comprises: reconstructing the L, C1 and C2 image components of each spatial area in the image, and encoding a pixel-domain residual for each component so as to respect a maximum allowed distortion level for each individual pixel in the spatial area, in the local perceptual space associated with that spatial area. In an exemplary embodiment, encoding the pixel-domain residual comprises quantizing the residual by a quantization step whose size is below a threshold value equal for example to twice the threshold $\Delta E^l$. The quantized residual are then entropy coded. In practice, such pixel-domain data coding may employ some known lossless coding techniques, like a trellis based coding technique for instance. The bitstream resulting from the encoding of refinement data can be multiplexed with the bitstream outputted in step 30.

Figure 2B:
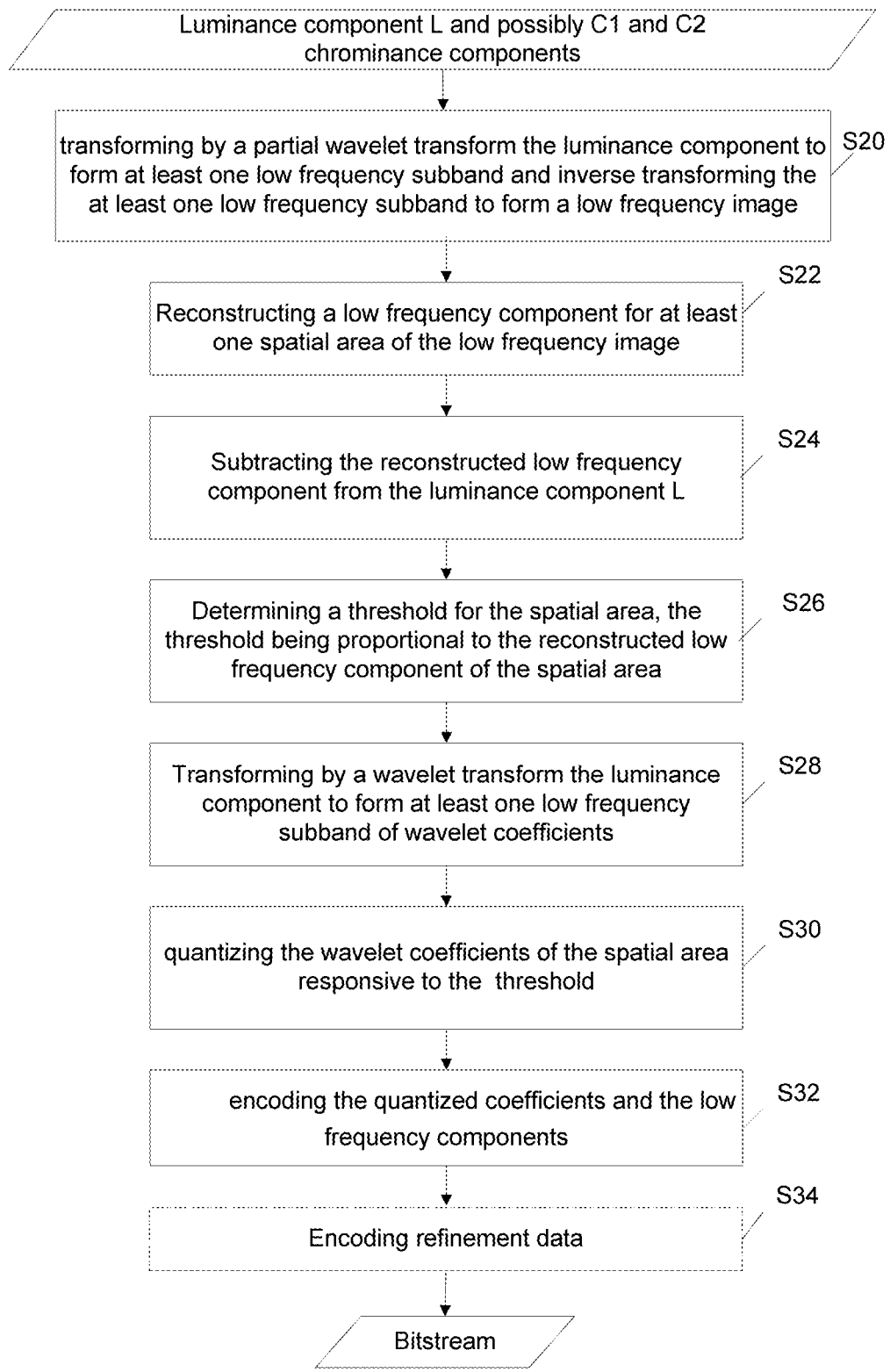

FIG. 2B represents a flowchart of a method for encoding, in a bitstream, an image Y represented in a perceptual color space, i.e. the LAB76, the LAB94 color space, and having at least one luminance component (L) according to a specific and non-limitative embodiment.

Figure 3B:
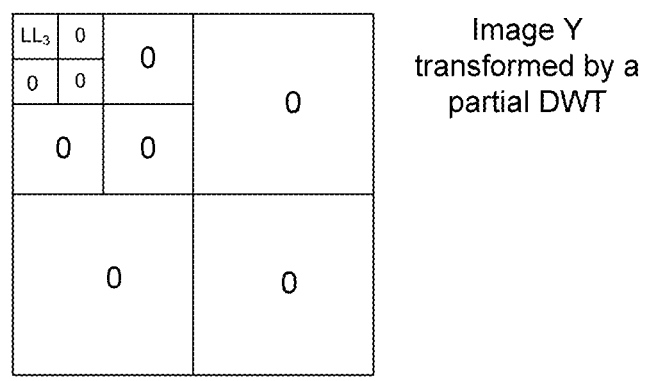
FIG. 3B shows an image transformed by a partial wavelet transform with 3 levels of decomposition.

In a step S20, the luminance component L of the image Y is transformed by a partial wavelet transform DWT, e.g. by a Discrete Wavelet Transform, to form at least one low frequency subband. FIG. 3B shows an image transformed by a wavelet transform with 3 levels of decomposition (d=1, 2 or 3). The transformed image is made of 10 subbands. On this figure, the low frequency subband is $LL_3$. The wavelet transform is said to be partial because the subband different from the low frequency subband are set to zero. The low frequency subband is then inverse transformed ($DWT^{-1}$) to form a low frequency image. The low frequency image is upsampled if necessary so that it has the same size as the image Y.

Figure 8B:
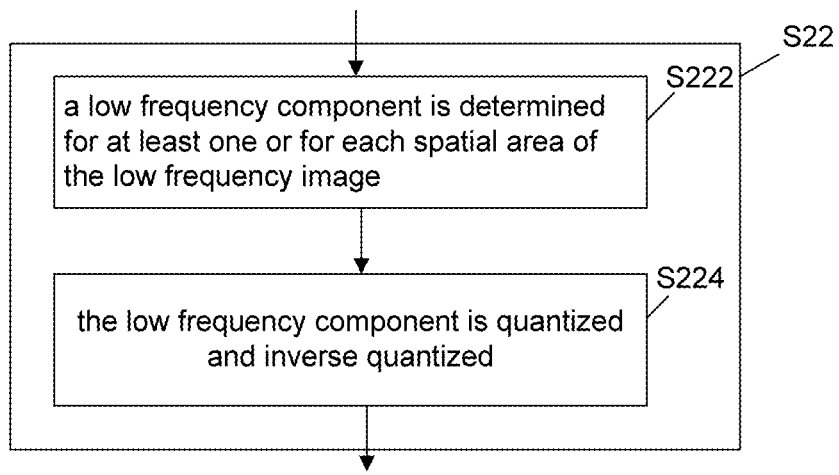
FIG. 8B represents a detail of the flowchart of the method for encoding an image depicted on FIG. 2B.

In a step S22, a low frequency component is reconstructed for at least one spatial area of the low frequency image. A spatial are may be a block comprising at least one pixel. In a variant, a low frequency component is reconstructed for each spatial area of the low frequency image. The step S22 is detailed on FIG. 8B.

Figure 4B:
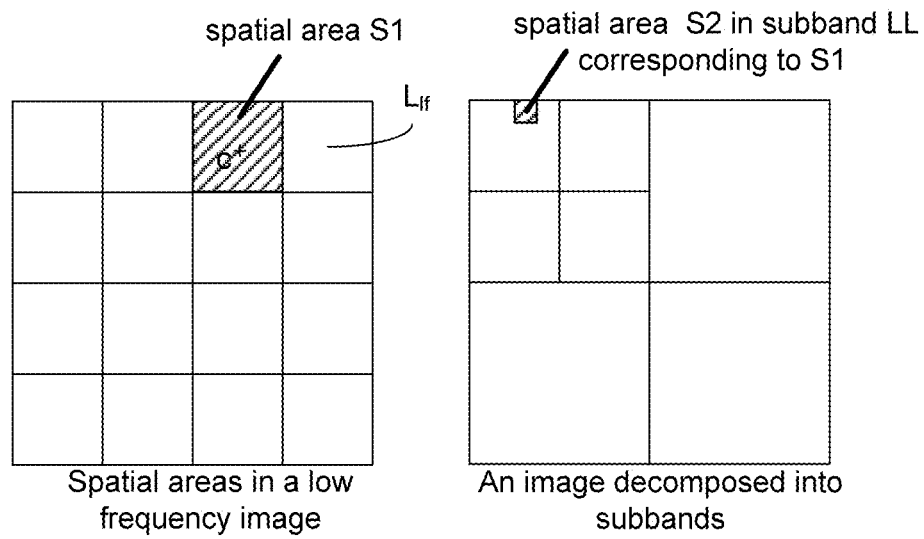
FIG. 4B shows a low frequency image divided into 16 spatial areas and an image decomposed into subbands.

In a sub-step S222, a low frequency component $L_{lf}$ is determined for the at least one spatial area of the low frequency image or for each spatial area. FIG. 4B shows the low frequency image divided into 16 spatial areas. The low frequency component $L_{lf}$ for a given spatial area S1 may be equal to an average of the pixel values of this spatial area. In a variant, the low frequency component $L_{lf}$ can be one pixel value of the spatial area, e.g. the value of the center pixel (e.g. the pixel c represented by a cross in the spatial area S1).

In a sub-step S224, the low frequency component $L_{lf}$ is quantized and inverse quantized. The low frequency component $\hat{L}_{lf}$ obtained after quantization and inverse quantization is the reconstructed low frequency component: $\hat{L}_{lf}$=IQ (Q($L_{lf}$)) where Q( ) and Q( ) are the quantizing and inverse quantizing functions respectively. The quantized low frequency component $L_{lf}$ may be advantageously used in a further step S30 of the encoding method.

In a step S24, for at least one or for each spatial area of the low frequency subband, the reconstructed low frequency component $\hat{L}_{lf}$ is subtracted from the luminance component L. In the case of the LA76 perceptual color space, the luminance component after the subtraction is equal to L-$\hat{L}_{lf}$.

In the case of the modified LAB94 perceptual color space, the luminance component $\tilde{L}$ after the subtraction is defined as follows:

$$\tilde{L} = \text{sign}((Lr)) \cdot \frac{116}{\beta} \cdot \ln\left(1 + \frac{|(Lr)| \cdot \beta}{116}\right), \text{ with } \beta \in [0, 1]$$

with Lr=L-$\hat{L}_{lf}$.

It will be appreciated, however, that the present principles are not restricted to these equations that are specific to the modified LAB94 color space. Exemplarily, the present principles are applicable to the LAB76 color space.

In a step S26, a threshold $\Delta E^I$ is determined for the at least one spatial area. In a variant, a threshold $\Delta E^I$ is determined for each spatial area. The threshold is proportional to the reconstructed low frequency component of this spatial area, i.e. $\Delta E^I \propto \hat{L}_{lf}$. Exemplarily, $$\Delta E^I = \Delta E_o \cdot \left(\frac{Y_l}{Y_n}\right)^{1/3} = \frac{\Delta E_o * \hat{L}_{lf}}{116}$$

where $\Delta E_o$ is dependent on the perceptual color space, and $Y_l$ is a linear-light luminance associated with the local environment of the considered spatial area. Therefore, the above equation represent the impact on the JND threshold obtained when changing the lighting environment from the nominal value $Y_n$ towards a local lighting environment represented by $Y_l$. In other words, when considering the Lab color transform equations, one gets the following relation:

$$\Delta E^I = \Delta E_o \cdot \frac{\hat{L}_{lf} + 16}{116}$$

If the linear part of the Lab color transform definition is ignored, one gets the following relation:

$$\Delta E^I = \Delta E_o \cdot \frac{\hat{L}_{lf}}{116}$$

In a step S28, the luminance component L or $\tilde{L}$ obtained after step S24 is transformed by a wavelet transform to form at least one low frequency subband of wavelet coefficients $c_b(u, v)$, b identify the subband to which the coefficient belong and (u,v) are its coordinates in the frequency domain.

If present, the chrominance components (e.g. $\widetilde{C_1}$ and $\widetilde{C_2}$ or C1 and C2) are also transformed by a wavelet transform into wavelet coefficients.

In a step S30, the wavelet coefficients $c_b(u, v)$ (obtained at step S28) of the at least one spatial area are quantized responsive to the threshold $\Delta E^I$ determined for this spatial area. In a variant, the wavelet coefficients $c_b(u, v)$ in each subband, i.e. the low frequency subband and the other subbands if any, and in each spatial areas are quantized responsive to the threshold $\Delta E^I$ of the spatial area of index I to which the wavelet coefficients belong. FIG. 5 depicts a spatial area 510 in the subband LL3 and its corresponding areas in the other subbands (grey area). All the wavelet coefficients in the grey areas are quantized using the same threshold $\Delta E^I$. Each spatial area in the low frequency subband LL corresponds to a spatial area in the low frequency image. Exemplarily, on FIG. 4B the spatial area S2 in the low frequency subband LL correspond to the spatial area S1 in the low frequency image (spatial correspondence). The spatial area S2 has the same spatial position in the low frequency subband LL as the spatial area S1 in the low frequency image. In the following two different embodiments are disclosed.

In a first embodiment, the wavelet coefficients of the at least one spatial area are first normalized by the threshold $\Delta E^I$ and then quantized by a quantization step $\Delta_b$. In a variant, the wavelet coefficients in each spatial area and in each subband b are first normalized by the threshold $\Delta E^I$ and then quantized by a quantization step $\Delta_b$. $\Delta_b$ is a quantization step whose size is independent of the spatial area but is defined for the subband b. $\Delta_b$ takes a value that is signaled in the bitstream and determined during the encoding process. It may be manually set or tuned to target a compressed picture size. Exemplarily, $\Delta b$ is identical for all subbands b.

$$c_b^I(u, v) = c_b(u, v) \cdot \frac{1}{\Delta E^I}, \forall b$$

According to a specific and non-limiting embodiment, the low frequency component(s) $L_{lf}$ is(are) encoded directly inside a normative JPEG2000 bitstream. In this case, the first $B_{lf}$ most significant bit planes are allocated for the encoding of these $L_{lf}$ values. Consequently, the normalization of the wavelet coefficients takes the following form:

$$c_b^I(u, v) = c_b(u, v) \cdot \frac{1}{\Delta E^I} \cdot 2^{B_{lf}}, \forall b$$

In the case where the low frequency component(s) $L_{lf}$ is(are) encoded as metadata, the normalization is done without multiplying by $2^{B_{lf}}$. When present, the chrominance wavelet coefficients are normalized as follows $$c_b^I(u, v) = c_b(u, v) \cdot \frac{1}{\Delta E^I}$$

whatever the subband is, i.e. b=LL or b≠LL. The normalized wavelet coefficients may be thresholded by an upper bound value. This makes it possible to encode them by a JPEG2000 encoder on a limited number of bits.

In a second embodiment, a quantization step size $\Delta_b^I$ is defined locally for a spatial area of index I as follows:

$$\Delta_b^I = \Delta_b \times \Delta E^I$$

Then, the wavelet coefficients in at least one spatial area of index I of the low frequency subband LL are quantized by the locally defined quantization step size $\Delta_{LL}^I$. In a variant, the wavelet coefficients in each spatial area of index I and in each subband b are quantized by the locally defined quantization step size $\Delta_b^I$. This second embodiment is applicable in cases where a quantization step is dedicated to some JPEG2000 coding entities that are representative of a spatial area in the image. In practice, this typically corresponds to precincts. In JPEG2000, a precinct contains all the coded data that represents the image at a given resolution level, at a given rectangular spatial location in the image. Hence precincts are a mean of representing an image area in a given resolution level in the compressed domain. It is possible to associate one quantization step to each precinct. Thus, in the present embodiment, a quantization step size $\Delta_b^I$ is associated with each precinct within each resolution level. Each precinct thus corresponds to a spatial area with which a value $\hat{L}_{lf}$ is associated.

In a step S32, the quantized wavelet coefficients (luminance and possibly chrominance) and possibly the locally defined low frequency component(s) is(are) entropy coded in a bitstream. Indeed, encoding of the low frequency components $L_{lf}$ is possibly done during sub-step S224. Encoding the low frequency components $L_{lf}$ comprises quantizing $L_{lf}$ by Q( ). In an advantageous variant, the quantized low frequency components are obtained directly from the sub-step S224 of step S22. In a specific and non-limiting embodiment, the quantized low frequency components $L_{lf}$ are encoded as metadata and the quantized wavelet coefficients are encoded by a JPEG2000 compliant encoder, specifically an EBCOT algorithm. EBCOT algorithm is a two-tiered architecture. Tier-1 is a context-based adaptive arithmetic coder, which is composed of a context formation (CF) engine and a binary arithmetic coder (BAC). Tier-2 is responsible for rate-distortion optimization and bitstream formation. In a variant, a JPEG2000 compliant encoder is used to encode both the quantized wavelet coefficients and the quantized low frequency components $L_{lf}$. More precisely, the quantized low frequency components $L_{lf}$ are encoded jointly with the code-blocks of the LL subband. The quantized low frequency components $L_{lf}$ occupy $B_{lf}$ first bit planes. They are thus encoded as MSB (MSB stands for Most Significant Bit) of the coefficients of the subband as illustrated by FIG. 6. The bit planes of the other coefficients are shifted. Exemplarily, JPEG2000 provides such a shifting technique for regions of interest coding. On the decoder side, this makes sure that the reconstructed low frequency component $\hat{L}_{lf}$ are available for decoding the image. The coding pass indicated on FIG. 6 is a coding pass as defined by JPEG2000.

In an optional step S34, refinement data are encoded in the pixel domain in addition to the already coded image data. The goal of this additional encoding is to ensure that for each pixel of a given spatial area, the error introduced between the decoded pixel and its original value is lower than the Just Noticeable Difference threshold $\Delta E^I$ associated with the local spatial area. Therefore, this additional encoding comprises: reconstructing the L, C1 and C2 image components (or $\tilde{L}$, $\widetilde{C_1}$, $\widetilde{C_2}$) of each spatial area in the image, and encoding a pixel-domain residual for each component so as to respect a maximum allowed distortion level for each individual pixel in the spatial area, in the local perceptual space associated with that spatial area. In an exemplary embodiment, encoding the pixel-domain residual comprises quantizing the residual by a quantization step whose size is below a threshold value equal for example to twice the threshold $\Delta E^I$. The quantized residual are then entropy coded. In practice, such pixel-domain data coding may employ some known lossless coding techniques, like a trellis based coding technique for instance. The bitstream resulting from the encoding of refinement data can be multiplexed with the bitstream outputted in step S32.

Figure 7:
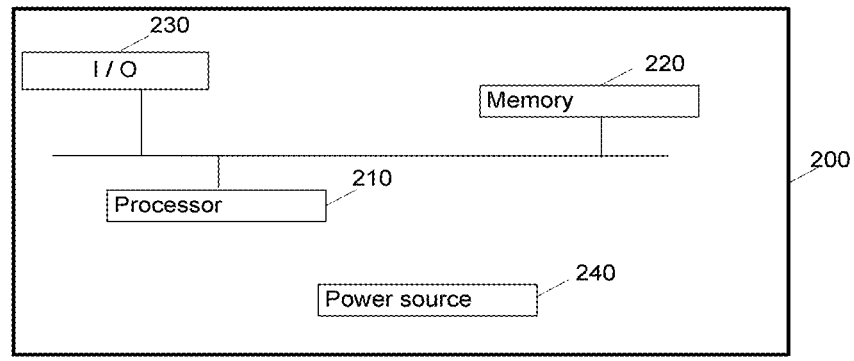
FIG. 7 represents an exemplary architecture of a decoding device configured to decode an image from a bitstream according to an exemplary embodiment.

FIG. 7 represents an exemplary architecture of the decoding device 200 configured to decode an image from a bitstream, wherein the image is represented in a perceptual color space and has at least one luminance component (L) according to an exemplary embodiment. The decoding device 200 comprises one or more processor(s) 210, which is(are), for example, a CPU, a GPU and/or a DSP (English acronym of Digital Signal Processor), along with internal memory 220 (e.g. RAM, ROM, EPROM). The decoding device 200 comprises one or several Input/Output interface(s) 230 adapted to display output information and/or allow a user to enter commands and/or data (e.g. a keyboard, a mouse, a touchpad, a webcam); and a power source 240 which may be external to the decoding device 200. The device 200 may also comprise network interface(s) (not shown). The bitstream may be obtained from a source. According to different embodiments, the source can be, but not limited to:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded image may be sent to a destination. As an example, the decoded image is stored in a remote or in a local memory, e.g. a video memory or a RAM, a hard disk. In a variant, the decoded image is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limitative embodiment, the decoding device 200 further comprises a computer program stored in the memory 220. The computer program comprises instructions which, when executed by the decoding device 200, in particular by the processor 210, make the decoding device 200 carry out the method described with reference to FIG. 9A or 9B. According to a variant, the computer program is stored externally to the decoding device 200 on a non-transitory digital data support, e.g. on an external storage medium such as a HDD, CD-ROM, DVD, a read-only and/or DVD drive and/or a DVD Read/

Write drive, all known in the art. The decoding device 200 thus comprises an interface to read the computer program. Further, the decoding device 200 could access one or more Universal Serial Bus (USB)-type storage devices (e.g., "memory sticks.") through corresponding USB ports (not shown).

According to exemplary and non-limitative embodiments, the decoding device 200 can be, but is not limited to:
- a mobile device;
- a communication device;
- a game device;
- a set top box;
- a TV set;
- a tablet (or tablet computer);
- a laptop;
- a display and
- a decoding chip.

Figure 9A:
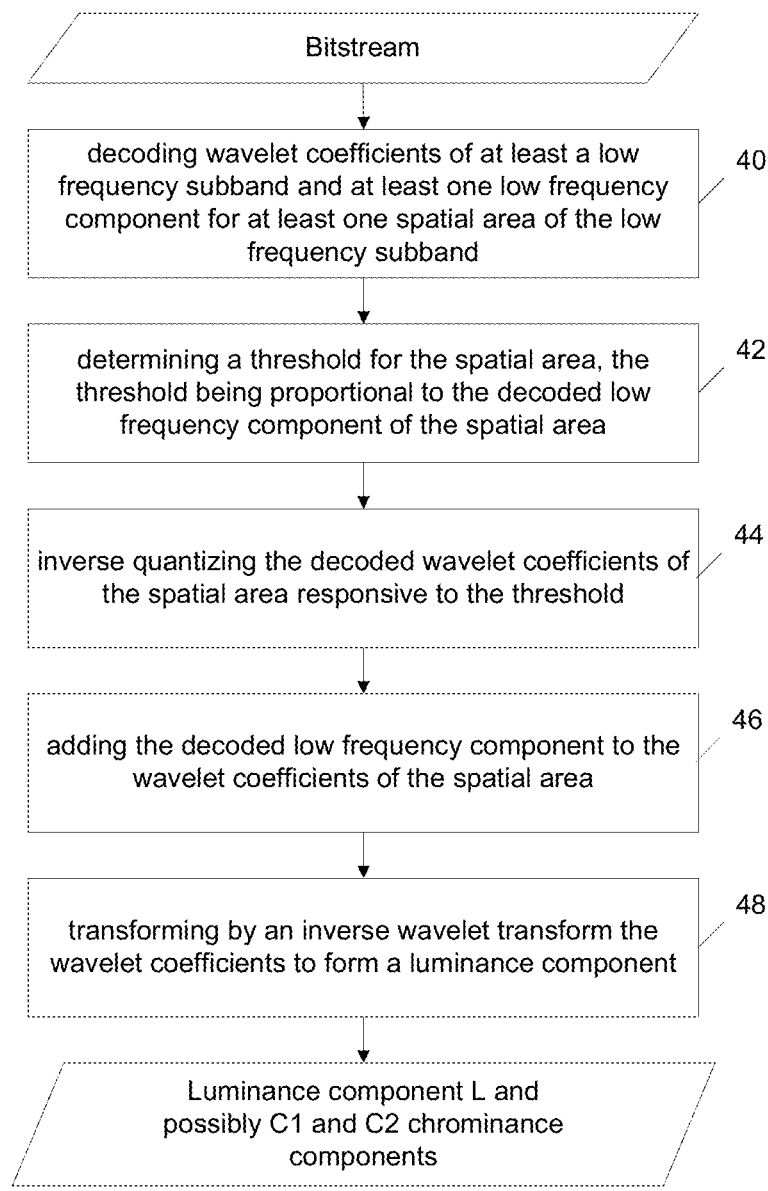
FIGS. 9A and 9B represent flowcharts of a method for decoding an image from a bitstream according to exemplary embodiments.

FIG. 9A represents a flowchart of a method for decoding an image from a bitstream, wherein the image is represented in a perceptual color space and has at least one luminance component (L) according to an exemplary embodiment. The same variants disclosed with respect to encoding method apply to decoding method.

In a step 40, wavelet coefficients of at least one low frequency subband and at least one low frequency component $\hat{L}_{lf}$ for at least one spatial area of the low frequency subband are decoded. The decoded wavelet coefficients are organized into subbands, specifically into at least one low frequency subband. If present, wavelet coefficients are also decoded for the chrominance components C1 and C2. The at least one low frequency component $\hat{L}_{lf}$ is decoded for at least one spatial area. In a variant, a low frequency component $\hat{L}_{lf}$ is decoded for each spatial area. More precisely, decoding $\hat{L}_{lf}$ comprises decoding a quantized coefficient ($Q(L_{lf})$) and inverse quantizing the decoded quantized coefficient in order to reverse the process applied on the encoder side, i.e. $\hat{L}_{lf}=IQ(Q(L_{lf}))$. The decoded wavelet coefficients are the quantized wavelet coefficients encoded in step 32 of the encoding method.

In a step 42, a threshold $\Delta E^I$ is determined for the at least one spatial area of the low frequency subband. In a variant, a threshold $\Delta E^I$ is determined for each spatial area of the low frequency subband. A spatial area may be a block comprising at least one low frequency wavelet coefficient. The threshold is proportional to the decoded low frequency component of this spatial area, i.e. $\Delta E^I \propto \hat{L}_{lf}$. Exemplarily, $$\Delta E^I = \Delta E_o \cdot \left(\frac{Y_l}{Y_n}\right)^{1/3} = \frac{\Delta E_o * \hat{L}_{lf}}{116}$$

where $\Delta E_o$ is dependent on the perceptual color space, and $Y_l$ is the linear-light luminance associated with the local environment of the considered spatial area. Therefore, the above equation represents the impact on the JND threshold obtained when changing the lighting environment from the nominal value $Y_n$ towards a local lighting environment represented by $Y_l$. In other words, when considering the Lab color transform equations, one gets the following relation:

$$\Delta E^I = \Delta E_o \cdot \frac{\hat{L}_{lf} + 16}{116}$$

If the linear part of the Lab color transform definition is ignored, one gets the following relation:

$$\Delta E^I = \Delta E_o \cdot \frac{\hat{L}_{lf}}{116}$$

In a step 44, the wavelet coefficients decoded at step 40 are inverse quantized into wavelet coefficients responsive to the threshold $\Delta E^I$ of the spatial area of index I to which the wavelet coefficients belong. FIG. 5 depicts a spatial area in the subband LL (grey area) and its corresponding area in the other subbands. All the wavelet coefficients in the grey area are inverse quantized using the same threshold $\Delta E^I$. In the following two different embodiments are disclosed.

In a first embodiment, the wavelet coefficients of the at least one spatial area are first inverse quantized by a quantization step $\Delta_b$ and then de-normalized by the threshold $\Delta E^I$, $c_b(u, v) = c_b^I(u, v) \cdot \Delta E^I$, where $\Delta_b$ is a quantization step whose size is independent of the spatial area but is defined for the subband b. $\Delta_b$ takes a value that is signaled in the bitstream and determined during the encoding process. It may be manually set or tuned to target a compressed picture size. Exemplarily, $\Delta b$ is identical for all subbands b. In a variant, the wavelet coefficients of each spatial area in each subband are first inverse quantized by a quantization step $\Delta_b$ and then de-normalized by the inverse of the threshold $\Delta E^I$.

According to a specific and non-limiting embodiment, the low frequency component(s) $\hat{L}_{lf}$ is(are) decoded from a normative JPEG2000 bitstream. In this case, the first $B_{lf}$ most significant bit planes are allocated for the decoding of these $\hat{L}_{lf}$ values. Consequently, the de-normalization of the wavelet coefficients takes the following form:

$$c_b(u, v) = c_b^I(u, v) \cdot \Delta E^I \cdot \frac{1}{2^{B_{lf}}}$$

In the case where the low frequency component(s) $L_{lf}$ is(are) encoded from metadata, the de-normalization is done without dividing by $2^{B_{lf}}$. When present, the chrominance wavelet coefficients are de-normalized as follows $c_b(u, v) = c_b^I(u, v) \cdot \Delta E^I$ whatever the subband is, i.e. b=LL or b≠LL.

In a second embodiment, a quantization step size $\Delta_b^I$ is defined locally for a spatial area of index I as follows:

$$\Delta_b^I = \Delta_b \times \Delta E^I$$

Then, the wavelet coefficients obtained at step 40 in at least one spatial area I of the low frequency subband LL are inverse quantized by the locally defined quantization step size $\Delta_{LL}^I$. In a variant, the wavelet coefficients in each subband b and each spatial area of index I are inverse quantized by the locally defined quantization step size $\Delta_b^I$. This second embodiment is applicable in cases where a quantization step is dedicated to some JPEG2000 coding entities that are representative of a spatial area in the image. In practice, this typically corresponds to precincts. In JPEG2000, a precinct contains all the coded data that represents the image at a given resolution level, at a given rectangular spatial location in the image. Hence precincts are a mean of representing an image area in a given resolution level in the compressed domain. It is possible to associate one quantization step to each precinct. Thus, in the present embodiment, a quantization step size $\Delta_b^I$ is associated with each precinct within each resolution level. Each precinct thus corresponds to a spatial area with which a value $\hat{L}_{lf}$ is associated.

In a step 46, for the at least one spatial area or for each spatial area of the low frequency subband, the decoded low frequency component $\hat{L}_{lf}$ is added to the corresponding wavelet coefficients of the low frequency subband (only for the luminance component). For each wavelet coefficient $c_{LL}(u, v)$ in the low frequency subband of the luminance component: $c_{LL}(u, v) = c_{LL}^I(u, v) + \hat{L}_{lf}$ where $(u,v)$ are the coordinates of the wavelet coefficient and the index I identifies the spatial area to which the wavelet coefficient $c_{LL}(u, v)$ belongs and $\hat{L}_{lf}$ is the reconstructed low frequency component determined for the spatial area to which $c_{LL}(u, v)$ belongs.

In a step 48, the wavelet coefficients obtained after step 44 possibly modified by step 46 are transformed by an inverse wavelet transform to form at least one luminance component L and possibly chrominance components C1 and C2 represented in a perceptual color space. In an optional step not represented on FIG. 9A, refinement data, i.e. the one encoded in the optional step 32, are decoded in the pixel domain and added to the components L, C1 and C2.

Optionally, the components L, C1, C2 are transformed in a non-perceptual color space such as the RGB color space.

Figure 9B:
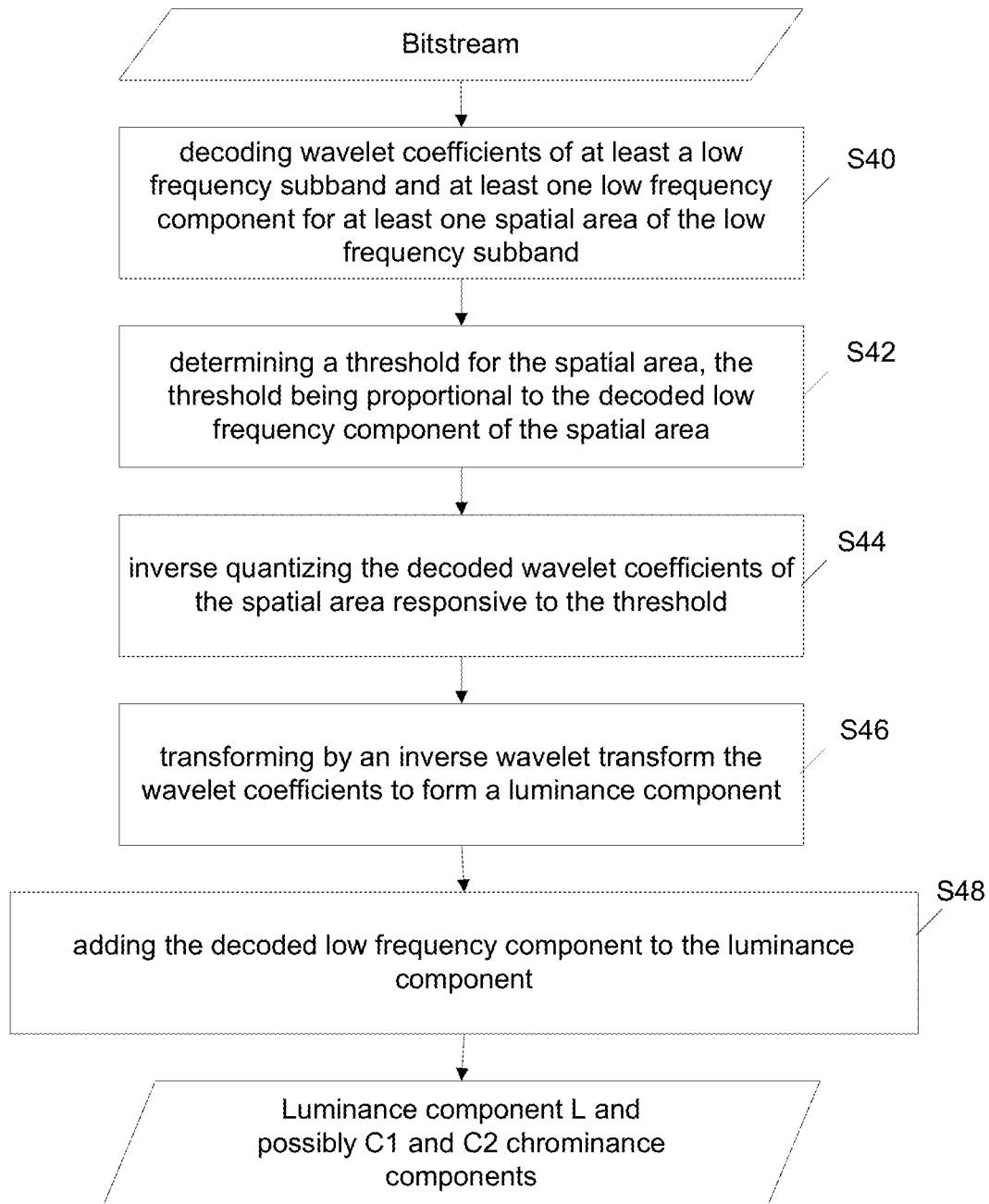

FIG. 9B represents a flowchart of a method for decoding an image from a bitstream, wherein the image is represented in a perceptual color space and has at least one luminance component (L) according to an exemplary embodiment.

In a step S40, wavelet coefficients of at least one low frequency subband and at least one low frequency component $\hat{L}_{lf}$ for at least one spatial area of the low frequency subband are decoded. The decoded wavelet coefficients are organized into subbands, specifically into at least one low frequency subband. If present, wavelet coefficients are also decoded for the chrominance components. The at least one low frequency component $\hat{L}_{lf}$ is decoded for at least one spatial area of the low frequency subband. In a variant, a low frequency component $\hat{L}_{lf}$ is decoded for each spatial area. More precisely, decoding $\hat{L}_{lf}$ comprises decoding a quantized coefficient ($Q(L_{lf})$) and inverse quantizing the decoded quantized coefficient in order to reverse the process applied on the encoder side, i.e. $\hat{L}_{lf} = IQ(Q(L_{lf}))$. The decoded wavelet coefficients are the quantized wavelet coefficients encoded in step 32 of the encoding method.

In a step S42, a threshold is determined for the at least one spatial area of the low frequency subband. In a variant, a threshold $\Delta E^I$ is determined for each spatial area of the low frequency subband. The threshold is proportional to the decoded low frequency component of this spatial area, i.e. $\Delta E^I \propto \hat{L}_{lf}$. Exemplarily, $$\Delta E^I = \Delta E_o \cdot \left(\frac{Y_l}{Y_n}\right)^{1/3} = \frac{\Delta E_o * \hat{L}_{lf}}{116}$$

where $\Delta E_o$ is dependent on the perceptual color space, and $Y_l$ is the linear-light luminance associated with the local environment of the considered spatial area. Therefore, the above equation represents the impact on the JND threshold obtained when changing the lighting environment from the nominal value $Y_n$ towards a local lighting environment represented by $Y_l$. In other words, when considering the Lab color transform equations, one gets the following relation:

$$\Delta E^I = \Delta E_o \cdot \frac{\hat{L}_{lf} + 16}{116}$$

If the linear part of the Lab color transform definition is neglected, one gets the following relation:

$$\Delta E^I = \Delta E_o \cdot \frac{\hat{L}_{lf}}{116}$$

In a step S44, the wavelet coefficients decoded at step S40 are inverse quantized into wavelet coefficients responsive to the threshold $\Delta E^I$ of the spatial area of index I to which the wavelet coefficients belong. FIG. 5 depicts a spatial area in the subband LL (grey area) and its corresponding area in the other subbands. All the wavelet coefficients in the grey area are inverse quantized using the same threshold $\Delta E^I$. In the following two different embodiments are disclosed.

In a first embodiment, the wavelet coefficients in each subband are first inverse quantized by a quantization step $\Delta_b$ and then de-normalized by the threshold $\Delta E^I$, $c_b(u, v) = c_b^I(u, v) * \Delta E^I$, where $\Delta_b$ is a quantization step whose size is independent of the spatial area but is defined for the subband b. $\Delta_b$ takes a value that is signaled in the bitstream and determined during the encoding process. It may be manually set or tuned to target a compressed picture size. Exemplarily, $\Delta b$ is identical for all subbands b. In a variant, the wavelet coefficients of each spatial area in each subband are first inverse quantized by a quantization step $\Delta_b$ and then de-normalized by the inverse of the threshold $\Delta E^I$.

According to a specific and non-limiting embodiment, the low frequency component(s) $\hat{L}_{lf}$ is(are) decoded from a normative JPEG2000 bitstream. In this case, the first $B_{lf}$ most significant bit planes are allocated for the decoding of these $\hat{L}_{lf}$ values. Consequently, the de-normalization of the wavelet coefficients takes the following form:

$$c_b(u, v) = c_b^I(u, v) \cdot \Delta E^I \cdot \frac{1}{2^{B_{lf}}}$$

In the case where the low frequency component(s) $L_{lf}$ is(are) encoded from metadata, the de-normalization is done without dividing by $2^{B_{lf}}$. When present, the chrominance wavelet coefficients are de-normalized as follows $c_b(u, v) = c_b^I(u, v) \cdot \Delta E^I$ whatever the subband is, i.e. b=LL or b≠LL.

In a second embodiment, a quantization step size $\Delta_b^I$ is defined locally for a spatial area of index I as follows:

$$\Delta_b^I = \Delta_b \times \Delta E^I$$

Then, the wavelet coefficients obtained at step S40 in at least one spatial area I of the low frequency subband LL are inverse quantized by the locally defined quantization step size $\Delta_{LL}^I$. In a variant, the wavelet coefficients in each subband b and each spatial area of index I are inverse quantized by the locally defined quantization step size $\Delta_b^I$. This second embodiment is applicable in cases where a quantization step is dedicated to some JPEG2000 coding entities that are representative of a spatial area in the image. In practice, this typically corresponds to precincts. In JPEG2000, a precinct contains all the coded data that represents the image at a given resolution level, at a given rectangular spatial location in the image. Hence precincts are a mean of representing an image area in a given resolution level in the compressed domain. It is possible to associate one quantization step to each precinct. Thus, in the present embodiment, a quantization step size $\Delta_b^l$ is associated with each precinct within each resolution level. Each precinct thus corresponds to a spatial area with which a value $\hat{L}_{lf}$ is associated.

In a step S46, the wavelet coefficients obtained after step S44 are transformed by an inverse wavelet transform into at least one luminance component (L or $\tilde{L}$) and possibly into chrominance components ($\widetilde{C_1}$, $\widetilde{C_2}$ or C1 and C2) represented in a perceptual color space. In an optional step, refinement data, i.e. the one encoded in the optional step S32, are decoded in the pixel domain and added to the luminance and chrominance components.

In a step S48, the decoded low frequency component $\hat{L}_{lf}$ is added to the luminance component. In the case of the modified LAB94 perceptual color space, the decoded low frequency component $\hat{L}_{lf}$ is added to Lr which is obtained from $\tilde{L}$. Optionally, the components L, C1, C2 are then transformed in a non-perceptual color space such as the RGB color space.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

This encoding/decoding method are particularly advantageous for visually-lossless encoding of HDR content and may be used in Digital cinema.

What is claimed is:

1. A method for encoding an image represented in a perceptual color space, wherein the image has at least a luminance component, the method comprising:
   transforming by a wavelet transform the luminance component to form at least one low frequency subband of wavelet coefficients;
   determining a low frequency component from the wavelet coefficient(s) of at least one spatial area of the low frequency subband;
   quantizing and inverse quantizing said determined low frequency component to obtain a reconstructed low frequency component $\hat{L}_{lf}$ for the at least one spatial area;
   subtracting the reconstructed low frequency component from the wavelet coefficients of the spatial area;
   quantizing the wavelet coefficients in the spatial area responsive to a threshold, wherein said threshold is proportional to the reconstructed low frequency component $\hat{L}_{lf}$; and
   encoding the quantized wavelet coefficients and the low frequency component.

2. The method of claim 1, wherein the spatial area comprises a single wavelet coefficient and wherein reconstructing a low frequency component for the spatial area of the low frequency subband comprises quantizing and inverse quantizing the single wavelet coefficient.

3. The method of claim 1, wherein the spatial area comprises at least two wavelet coefficients and wherein reconstructing a low frequency component for the spatial area of the low frequency subband comprises averaging the at least two wavelet coefficients into an averaged coefficient, quantizing and inverse quantizing the average coefficient.

4. The method of claim 1, wherein quantizing the wavelet coefficients of the spatial area comprises:
normalizing the wavelet coefficients using the threshold of the spatial area; and
quantizing the normalized wavelet coefficients using a quantization step size independent of the spatial area.

5. The method according to claim 3, wherein quantizing the wavelet coefficients in the spatial area comprises:
determining a quantization step size for the spatial area from the threshold of the spatial area; and
quantizing the wavelet coefficients using the determined quantization step size.

6. The method of claim 1, wherein the image has at least one chrominance component and wherein the method further comprises:
transforming by the wavelet transform the at least one chrominance component into chrominance wavelet coefficients; and
normalizing the chrominance wavelet coefficients by the threshold of the spatial area to which the chrominance wavelet coefficients belong.

7. The method of claim 1, wherein the at least one low frequency subband of wavelet coefficients being divided into spatial areas, the method applies on each spatial area.

8. A coding device for encoding an image represented in a perceptual color space, the image having at least a luminance component, wherein the coding device comprises at least a processor configured to:
transform by a wavelet transform the luminance component to form at least one low frequency subband of wavelet coefficients;
determine a low frequency component from the wavelet coefficient(s) of at least one spatial area of the low frequency subband;
quantize and inverse quantize said determined low frequency component to obtain a reconstructed low frequency component $\hat{L}_{lf}$ for the at least one spatial area;
subtract the reconstructed low frequency component from the wavelet coefficients of the spatial area;
quantize the wavelet coefficients in the spatial area responsive to a threshold, wherein said threshold is proportional to the reconstructed low frequency component; and
encode the quantized wavelet coefficients and the low frequency component.

9. The coding device of claim 8, wherein the spatial area comprises a single wavelet coefficient and wherein to reconstruct a low frequency component for the spatial area of the low frequency subband comprises quantizing and inverse quantizing the single wavelet coefficient.

10. The coding device of claim 8, wherein the spatial area comprises at least two wavelet coefficients and wherein to reconstruct a low frequency component for the spatial area of the low frequency subband comprises averaging the at least two wavelet coefficients into an averaged coefficient, quantizing and inverse quantizing the average coefficient.

11. The coding device of claim 8, wherein to quantize the wavelet coefficients of the spatial area comprises:
normalizing the wavelet coefficients using the threshold of the spatial area; and
quantizing the normalized wavelet coefficients using a quantization step size independent of the spatial area.

12. The coding device of claim 10, wherein to quantize the wavelet coefficients in the spatial area comprises:
determining a quantization step size for the spatial area from the threshold of the spatial area; and
quantizing the wavelet coefficients using the determined quantization step size.

13. The coding device of claim 8, wherein the image has at least one chrominance component and wherein the at least one processor is further configured to:
transform by the wavelet transform the at least one chrominance component into chrominance wavelet coefficients; and
normalize the chrominance wavelet coefficients by the threshold of the spatial area to which the chrominance wavelet coefficients belong.

14. The coding device of claim 8, wherein the at least one low frequency subband of wavelet coefficients being divided into spatial areas, the at least a processor processes each spatial area.

15. A method for decoding an image having at least a luminance component represented in a perceptual color space, the method comprising:
decoding wavelet coefficients of at least a low frequency subband and a low frequency component for at least one spatial area of the low frequency subband;
inverse quantizing the decoded wavelet coefficients of the spatial area responsive to a threshold, the threshold being proportional to the decoded low frequency component of the spatial area;
adding the decoded low frequency component to the wavelet coefficients of the spatial area; and
transforming by an inverse wavelet transform the wavelet coefficients to form a reconstructed luminance component.

16. The method according to claim 15, wherein inverse quantizing the wavelet coefficients of the spatial area comprises:
inverse quantizing the wavelet coefficients; and
de-normalizing the wavelet coefficients using the threshold of the spatial area.

17. The method according to claim 15, wherein inverse quantizing the wavelet coefficients of the spatial area comprises:
determining a quantization step size for the spatial area from the threshold of the spatial area; and
inverse quantizing the wavelet coefficients using the determined quantization step size.

18. The method according to claim 15, wherein the image has at least one chrominance component and wherein the method further comprises:
decoding chrominance wavelet coefficients; and
de-normalizing the chrominance wavelet coefficients by the threshold of the spatial area to which the chrominance wavelet coefficients belong.

19. The method according to claim 15, wherein the at least one low frequency subband of wavelet coefficients being divided into spatial areas, the method applies on each spatial area.

20. A decoding device for decoding an image having at least a luminance component represented in a perceptual color space, wherein the decoding device comprises at least a processor configured to:
decode wavelet coefficients of at least a low frequency subband and a low frequency component for at least one spatial area of the low frequency subband;

inverse quantize the decoded wavelet coefficients of the spatial area responsive to a threshold, the threshold being proportional to the decoded low frequency component of the spatial area;

add the decoded low frequency component to the wavelet coefficients of the spatial area; and transform by an inverse wavelet transform the wavelet coefficients to form a reconstructed luminance component.

21. The decoding device according to claim 20, wherein to inverse quantize the wavelet coefficients of the spatial area comprises:

inverse quantizing the wavelet coefficients; and de-normalizing the wavelet coefficients using the threshold of the spatial area.

22. The decoding device according to claim 20, wherein to inverse quantize the wavelet coefficients of the spatial area comprises:

determining a quantization step size for the spatial area from the threshold of the spatial area; and inverse quantizing the wavelet coefficients using the determined quantization step size.

23. The decoding device according to claim 20, wherein the image has at least one chrominance component and wherein the at least one processor is further configured to:

decode chrominance wavelet coefficients; and de-normalize the chrominance wavelet coefficients by the threshold of the spatial area to which the chrominance wavelet coefficients belong.

24. The decoding device according to claim 20, wherein the at least one low frequency subband of wavelet coefficients being divided into spatial areas, at least a processor processes each spatial area.

* * * * *